Feb. 23, 1932.  D. J. HUGHES  1,846,335
AUTOMATIC NONSKID DEVICE
Filed May 10, 1930  3 Sheets-Sheet 1
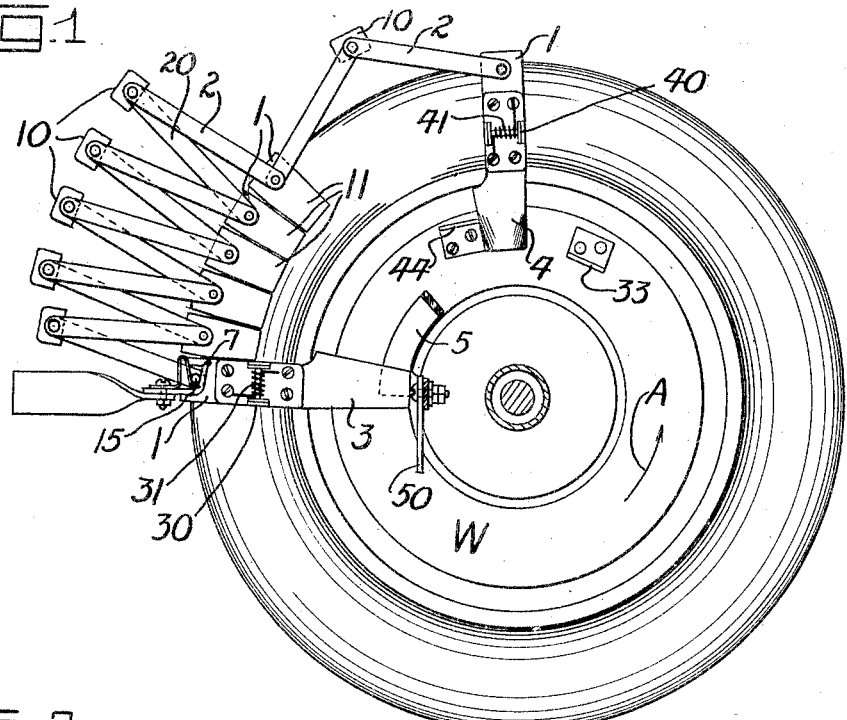
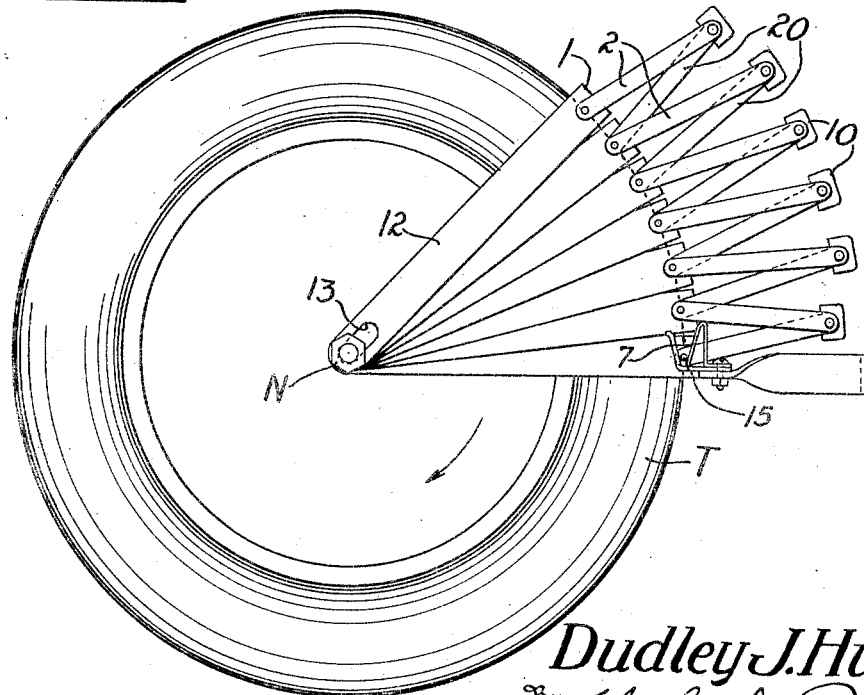
Inventor
Dudley J. Hughes
By Charles L. Reynolds
Attorney Feb. 23, 1932.  D. J. HUGHES  1,846,335
AUTOMATIC NONSKID DEVICE
Filed May 10, 1930  3 Sheets-Sheet 2
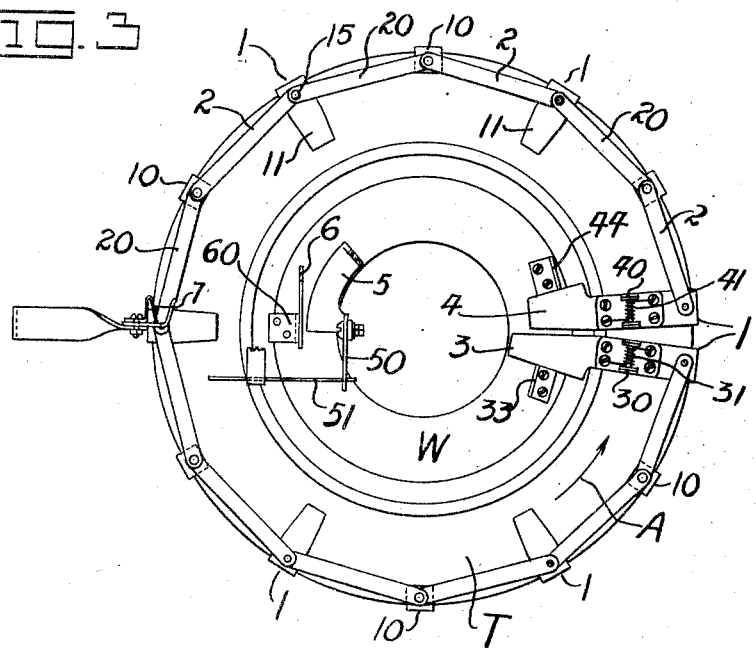
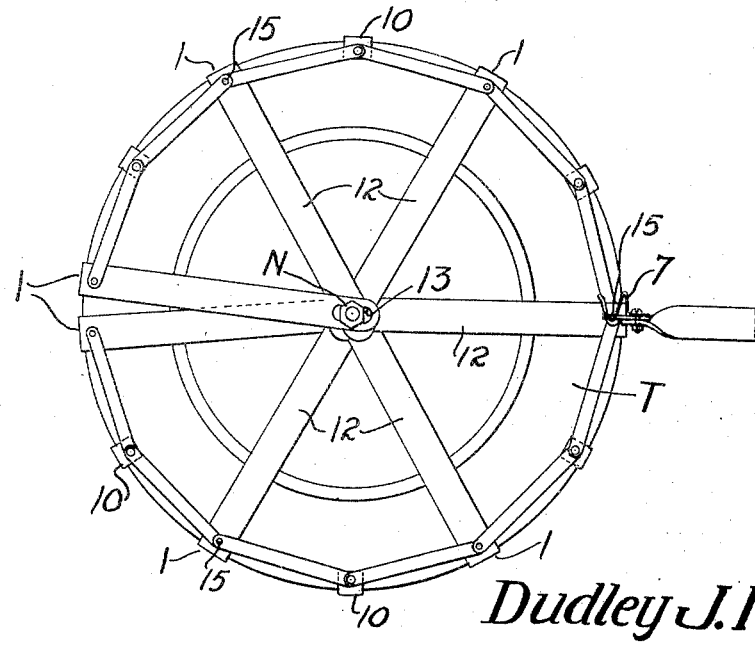
Inventor
Dudley J. Hughes
By Charles L. Reynolds
Attorneys

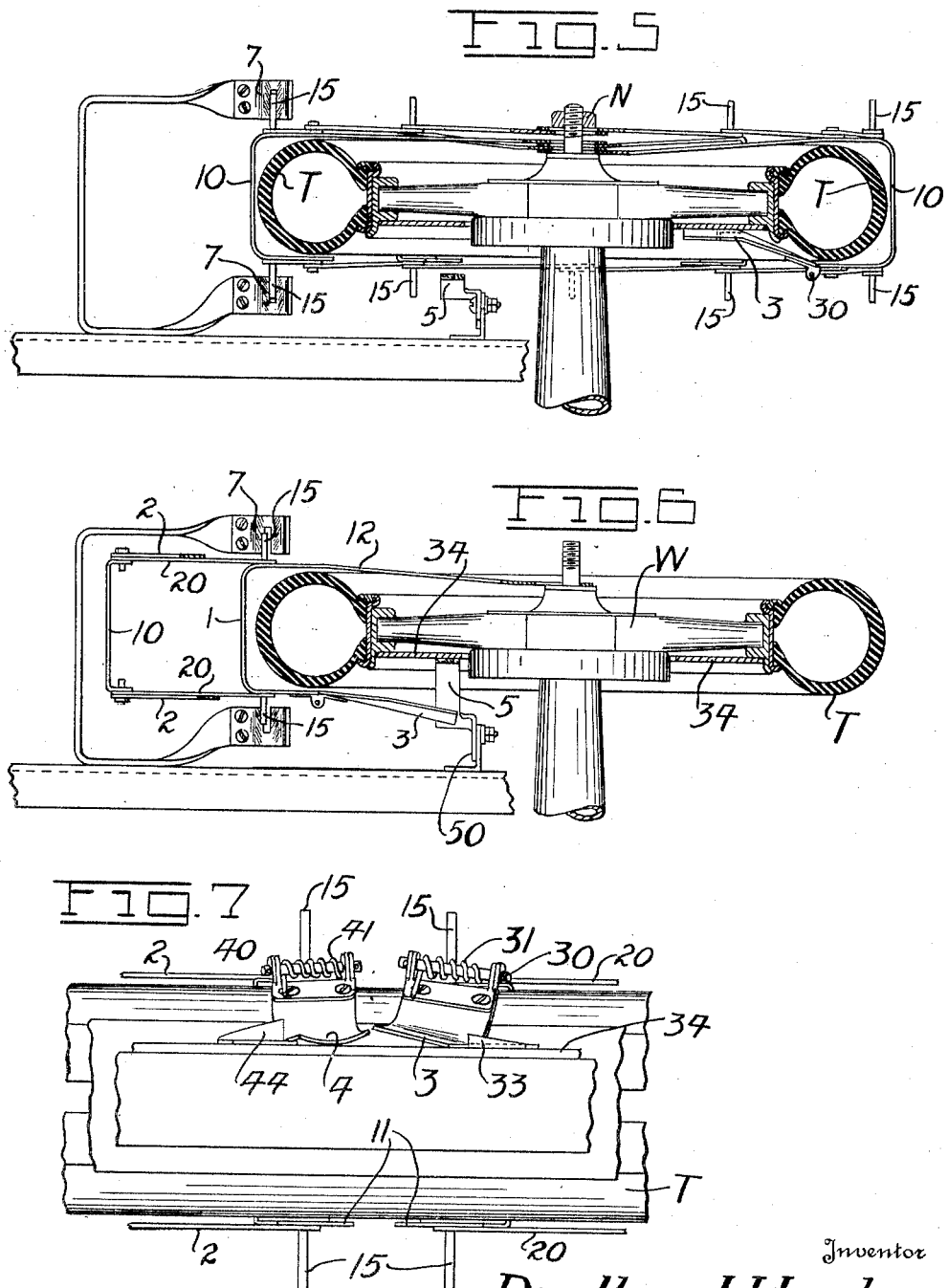

Patented Feb. 23, 1932

1,846,335

UNITED STATES PATENT OFFICE

DUDLEY J. HUGHES, OF SEATTLE, WASHINGTON

AUTOMATIC NONSKID DEVICE

Application filed May 10, 1930. Serial No. 451,351.

My invention relates to an improvement in non-skid devices, particularly intended for use upon automobiles, trucks, and the like, and the particular aim of my invention is to provide a device of the character indicated, which may be applied to the wheels as and when needed, and removed when not needed, the entire cycle of operation being controlled by the driver in his seat, and without the necessity of stopping the car. In other words, my invention relates to a non-skid device which may be applied to the several wheels of a car while the car is in motion, and without the necessity of the driver touching anything other than the control, or performing any manual labor.

My invention comprises the novel parts and the novel combination and arrangement thereof as shown in the accompanying drawings, described in this specification, and as will be more particularly pointed out by the claims which terminate the same.

In the accompanying drawings, I have shown my invention in a form which is now preferred by me, it being understood that the same may be embodied in various forms, and that it may be variously incorporated in the structure of the automobile to which it is applied.

Figures 1 and 2 are respectively inside and outside elevations of my device, applied to the wheel of an automobile, in the one case, in process of being applied and in the other case, completely inoperative.

Figures 3 and 4 are views corresponding in point of view respectively to Figures 1 and 2, showing the device in operative position.

Figure 5 is an axial section through a tire and wheel, showing my device applied thereto.

Figure 6 is likewise an axial section through the tire and wheel, showing my device in inoperative position.

Figure 7 is a detail view, looking outward from beneath the rim of an automobile wheel, showing the means for interengagement between the wheel and the non-skid device, parts being shown in operative position.

Essentially, the non-skid device comprises a plurality of tread members 1 and 10. The members 1 may be provided with guide fingers 11, by means of which they engage the side walls of a tire to guide the tread members 1 into place. The members 1 and 10 are connected by tension members such as the links 2 and 20, each pivotally connected at its ends to the respective members 1 and 10. By the buckling of these links 2 and 20, the entire series of tread members 1 may be drawn closely together in a group at a selected point adjacent the periphery of the wheel W, and as may be best observed in Figure 2. At such times the tread members 10 are closely grouped, but outward of the tire. A radial link on the outer side of each of the tread members 1, the same having an elongated aperture 13, holds the tread members in position relative to the axle of the wheel W, the projection of the axle passing through the several apertures 13, and the same being held in place by a nut N. The purpose of the elongated apertures 13 is to permit movement radially of the tread members as the tire T flexes.

Secured to one of the terminal tread members 1 of the series (the leading one, in the direction of the wheel's rotation) is a yieldingly supported finger 3, which may be hinged at 30, and which is held adjacent or in contact with the wheel W, by means of a spring 31, or which, if not so held, at least tends to be held in this position by the spring mentioned. Secured to the last or terminal tread member 1 is a second yieldingly supported finger 4, hingedly secured at 40, and likewise having a spring indicated at 41, tending to hold it also in contact with the wheel W, which rotates in the direction of the arrow A. I prefer that one of these fingers be longer than the other, and have shown the finger 3 as the longer.

Secured upon the inside of the wheel are two dogs 33 and 44. The first is positioned to engage the finger 3, and the finger 4 will ride thereover, its surface being inclined, and the leading edge of the finger 4 being upturned. The latter dog 44, permits the two fingers to ride over it, but then engages behind the finger 4 so that the latter may not back off of it, should the direction of the wheel's rotation be reversed, and thus the two terminal tread members 1 are held closely adjacent to one another, with the remainder of the tread members distributed about the tire and spaced by the links 2 and 20.

At some position adjacent the path of travel of the end of the finger 4, there is positioned a trip member 5, which may be thrown into position to engage the wheel or a plate 34 which is secured on the inside of the same, and which supports the dogs 33 and 44. This trip member 5, when thrown into this position, as illustrated in Figure 6, will engage the end of the finger 3 and cause the same to ride up on the trip 5, and to be thus disengaged from the dog 33, and held out of its path of movement. This in itself would not be enough to check the movement of the tread members 1 and to disengage them from the wheel, but each tread member is provided with a series of pins 15, which may be engaged by spring detents 7 which are slotted to permit the pins to pass through, but which are so positioned that the pins must engage them each time they pass the point where the detents 7 are located. The frictional engagement of these detents 7, then, with the pins 15, will check the tread member 1, which has now been disengaged from the dog 33, and the tread members will pile up, each one engaging the succeeding one, until a compact group has been built up such as that shown in Figure 2. The finger 4 is long enough to ride upon the trip 5, to remove this finger from contact with the wheel, as well as the finger 3. Here the group will remain, held by the detents 7 until positively moved from this position; the fingers 3 and 4 will remain in engagement with the trip member 5 and the same will be held away from contact with the plate 34 to avoid noise.

Now, when it is desired to apply the non-skid device, the finger 3 is forced past the end of the trip member 5, and the pins 15 of this particular terminal tread member 1 are forced through the detents 7, and the finger 3 is then permitted to throw down, under the influence of its spring 31, into position to be engaged by its dog 33. The dog 33 draws the entire series out, one section at a time, as the wheel rotates, until finally the finger 4 is engaged back of the dog 44, when parts have reached the position of Figures 3 and 4. To disengage the parts, and to place them in inoperative position, it is only necessary, as has already been pointed out, to move the trip member 5 into position to engage the finger 3, which causes the entire group of tread members to pile up again.

Two actions are necessary for the complete cycle of operation, one being that necessary to throw the trip member 5 into position to engage the finger 3, and the other being that necessary to force the finger 3 past the trip member 5 and to force its pins 15 initially through the slots in the detents 7. The first of these actions may be accomplished by a lever 50 fast to the trip member 5, and engageable by a lever 51 which can be moved by a suitable connection, such as a wire cable, from the driver's seat. The second action can be accomplished by a lever 6, which is pivoted at 60, and which can similarly be connected by a cable or equivalent means to the driver's seat. The grouping and the controls can be located beneath the fender, for instance, where they are inconspicuous, yet always available for instant use. By removing the non-skid treads (a simple operation, hence liable to be done when they are not needed) a great deal of useless wear on them will be avoided, and the device will have a long life and see frequent service.

What I claim as my invention is:

1. In combination with a wheel and tire, a plurality of tread members, tension members joining the several tread members, but collapsible to permit their collection in a compact group, means for retaining the tread members grouped in position, means upon the wheel, and engageable at will, as the wheel rotates with the leading tread member in the direction of the wheel's rotation, to expand the group and to distribute the tread members about the periphery of the tire, and other means upon the wheel to engage and hold the last tread member of the group to the wheel.

2. In combination with a wheel and tire, a plurality of tread members, tension members joining the several tread members, but collapsible to permit their collection in a compact group, means for retaining the tread members grouped in position, means upon the wheel, and engageable at will with a leading tread member as the wheel rotates, to expand the group and to distribute the other tread members about the periphery of the tire, and means operable from a distance, at will, to disengage the tread member from the member upon the wheel.

3. In combination with a wheel and tire, a plurality of tread members, tension members joining the several tread members, but collapsible to permit their collection in a compact group, means for retaining the tread members grouped in position, means operable from a distance at will to move the leading tread member of the group, in the direction of the wheel's rotation, into position in readiness to be engaged by a member upon the wheel, a member upon the wheel to engage said leading tread member, thus positioned in readiness, as the wheel rotates, to distribute the other tread members about the periphery of the tire.

4. In combination with a wheel and tire, a plurality of tread members, tension members joining the several tread members, but collapsible to permit their collection into a compact group, means for retaining the tread members grouped in position, means operable from a distance at will to move the leading tread member of the group, in the direction of the wheel's rotation, into position in readiness to be engaged by a member upon the wheel, a member upon the wheel to engage said leading tread member, thus positioned in readiness, as the wheel rotates, to distribute the other tread members about the periphery of the tire, and means operable from a distance to disengage the tread member from said member upon the wheel.

5. In combination with a wheel and tire, a plurality of tread members, links joining successive tread members, means restraining alternate tread members against movement away from the tread of the tire, and the remaining tread members being free to move away therefrom, within the limits of said links, to form a compact group, means restraining said group against movement, and a dog upon the wheel, and engageable at will with a tread member as the wheel rotates, to expand the group and to distribute the tread members about the periphery of the tire.

6. The combination of claim 5, and a second dog engageable with another tread member, to prevent disengagement of the treads upon reverse operation of the wheel.

7. The combination of claim 5, the leading tread member, in the direction of the wheel's rotation, having a finger hingedly projecting therefrom, and the dog referred to being engageable with said finger to draw the remaining tread members after this leading one.

8. The combination of claim 5, the leading tread member, in the direction of the wheel's rotation, having a finger hingedly projecting therefrom, and the dog referred to being engageable with said finger to draw the remaining tread members after this leading one, and the last tread member likewise having a finger hinged thereon, and a second dog on the wheel at a greater radial distance than the first dog, and engageable behind the second finger to prevent disengagement of the tread members upon reversal of the wheel's direction of rotation.

9. The combination of claim 5, the group-restraining means comprising slotted spring members fixed in position adjacent the periphery of the tire, and pins carried by each of the radially restrained tread members, and engageable with said spring members, the latter yielding upon application of a force to permit passage of the pins.

10. The combination of claim 5, the group-restraining means comprising slotted spring members fixed in position adjacent the periphery of the tire, and pins carried by each of the radially restrained tread members, and engageable with said spring members, the latter yielding upon application of a force to permit passage of the pins, and means operable to bring a portion of the leading tread member of the group into position to be engaged by the wheel-supported dog, to apply such force as the wheel rotates.

11. The combination of claim 5, the leading tread member having a yieldingly supported finger, the dog being engageable therewith to expand the group, and a lever engageable at will with the said finger to hold the same out of the path of travel of said dog.

12. The combination of claim 5, the leading tread member having a yieldingly supported finger, the dog being engageable therewith to expand the group, and a lever engageable at will with the said finger to hold the same out of the path of travel of said dog, and a second lever operable at will to force said finger past said first lever, and to permit it to lie in the path of said dog.

13. The combination of claim 5, the tread-restraining means comprising a radius link slotted at its inner end and connected to the tread member at its outer end, and a bolt in the axis of the wheel received in the several slots.

14. In combination with a wheel and tire, a plurality of tread members and connecting tension members, means controlled by rotation of the wheel for distributing the tread members about the periphery of the tire, means operable at will to initiate distribution of the tread members about the tire, and means operable at will in association with rotation of the wheel to remove the tread members from about the wheel.

15. In combination with a wheel and tire, a plurality of tread members and connecting tension members, means controlled by rotation of the wheel for distributing the tread members about the periphery of the tire, means operable at will to initiate distribution of the tread members about the tire, means operable at will in association with rotation of the wheel to remove the tread members from about the wheel, and means operable from a distance to control the distribution-initiating means and the removal means.

16. In combination with a wheel and tire, a plurality of tread members and connecting tension members, means controlled by rotation of the wheel for distributing the tread members about the periphery of the tire, means operable at will to initiate distribution of the tread members about the tire, means operable at will in association with rotation of the wheel to remove the tread members from about the wheel, and means operable from a distance to control the removal means.

Signed at Seattle, King county, Washington, this 2nd day of April, 1930.

DUDLEY J. HUGHES.